United States Patent [19]

Tonai et al.

[11] Patent Number: 4,946,337
[45] Date of Patent: Aug. 7, 1990

[54] PARALLEL LINK ROBOT ARM

[75] Inventors: Shuichi Tonai, Kitakyushu; Shigeo Matsushita, Yukuhashi, both of Japan

[73] Assignee: Kabushiki Kaisha Yaskawa Denki Seisakusho, Fukuoka, Japan

[21] Appl. No.: 215,328

[22] Filed: Jul. 5, 1988

[30] Foreign Application Priority Data

Jul. 9, 1987 [JP] Japan .................... 62-105667

[51] Int. Cl.⁵ ............................. B66C 23/00
[52] U.S. Cl. .................... 414/744.5; 901/4; 901/21; 414/917; 414/733; 414/709
[58] Field of Search ........... 414/917, 744.1, 744.2, 414/744.5, 733, 706, 707, 709, 710; 901/4, 21

[56] References Cited

U.S. PATENT DOCUMENTS

| 3,591,025 | 7/1971 | Perrott | 414/709 X |
|---|---|---|---|
| 4,300,198 | 11/1981 | Davini | 901/4 X |
| 4,341,502 | 7/1982 | Makino | 414/917 X |
| 4,378,836 | 4/1983 | Moussault | 414/733 X |
| 4,396,344 | 8/1983 | Sugimoto et al. | 414/917 X |
| 4,398,863 | 8/1983 | Shun | 414/709 X |
| 4,648,785 | 3/1987 | Nakagawa et al. | 414/917 X |

FOREIGN PATENT DOCUMENTS

| 0200105 | 11/1986 | European Pat. Off. . | |
| 0205975 | 12/1986 | European Pat. Off. . | |
| 2701151 | 7/1978 | France | 414/733 |
| 2802738 | 7/1979 | France . | |
| 0031456 | 3/1977 | Japan | 74/479 |
| 0059309 | 5/1981 | Japan | 901/4 |
| 0779065 | 11/1980 | U.S.S.R. | 414/917 |
| 0856627 | 12/1960 | United Kingdom | 414/707 |
| 2060556 | 5/1981 | United Kingdom . | |
| 2061872 | 5/1981 | United Kingdom . | |
| 8707199 | 12/1987 | World Int. Prop. O. | 414/744.5 |

Primary Examiner—Robert J. Spar
Assistant Examiner—William M. Hienz
Attorney, Agent, or Firm—Beveridge, DeGrandi & Weilacher

[57] ABSTRACT

In a precision operable robot arm comprising four levers pivotally connected with each other into a paralle arranged link form, when one ends of first and second levers aligned vertically, for example, are driven respectively by two motors such that the levers are swung around the alignment axis in a horizontal plane, for example, a work supporting device provided at an outwardly extending end of the fourth lever is also moved in a horizontal plane.

A first pulley is fixedly secured to a position aligning with the driving shafts of the two motors, while second and third pulleys, which are integrally rotatable, are rotatably supported by a pivot pin coupling the second and fourth levers, and fourth pulley rotatably supported at the outer end of the fourth lever is fixed to the work supporting device. First and second belts are extended around the first pulley and the second pulley, and the third pulley and the fourth pulley, respectively, so that the work supporting device is held in the same posture regardless of the movement thereof in the plane.

6 Claims, 2 Drawing Sheets

PARALLEL LINK ROBOT ARM

BACKGROUND OF THE INVENTION

This invention relates to a parallel link robot arm adapted to transport works of comparatively light weight such as semiconductor wafers and IC's without changing posture.

A construction for maintaining a work supporting device provided at an arm end in the same posture, during the arm rotation, has been disclosed in U.S. Pat. No. 3,182,813, in which a chain wheel provided concentrically with the rotating axis of the arm is coupled by chain with the work supporting device provided at the end of the arm.

However, the disclosed construction is operable for transporting works to specific positions along a semicircle by means of a single arm of a comparatively large size, and hence it is difficult to apply such a construction to a parallel link type robot arm which transports works to programmed positions in a plane at a high speed as in the case of securing IC's on, for instance, an IC board.

Another construction to control the attitude and position of a work supporting device by three driving motors, has been disclosed in GB No. 2 060 556A, in which a belt driven by a motor and belts to rotate the work supporting device is connected for controlling the attitude of the work supporting device.

However, in the disclosed construction, the work supporting device can maintain the constant attitude by means of controlling the rotating angle of the motor.

SUMMARY OF THE INVENTION

An object of the present invention is to provide a robot arm of a parallel link type which is simple in construction, and easy in maintenance and economical in production.

Another object of the invention is to provide a robot arm of a parallel link type capable of transporting works such as IC to programmed positions in a plane at a high speed without changing the posture of the work supporting device.

These and other objects can be achieved by a robot arm of a parallel link type with a work supporting device provided at an end of the arm, the robot arm comprising first and second driving shafts rotatably secured to a supporting member of the robot in an axial alignment; first and second levers, one end of the first lever is fixed to the shaft of the first driving motor, while one end of the second lever is fixed to the shaft of the second driving motor; a third lever, one end of which is pivotally connected to the other end of the first lever; a fourth lever, one end of which is pivotally connected with the other end of the second lever, while the other end of which is rotatably connected to the work supporting device; an intermediate portion of the fourth lever being pivotally connected with one part of the third lever; a first pulley fixedly secured to the supporting member of the robot in alignment with the driving shafts; a second pulley provided freely rotatably around a pivot axis connecting the second lever with the fourth lever; a third pulley integrally rotatable with the second pulley; a fourth pulley secured coaxially to the work supporting device to be rotatable around a pivot pin that connects the fourth lever with the supporting device; a first belt extended to couple the first pulley with the second pulley; and a second belt extended to couple the third pulley with the fourth pulley.

The pitch circle diameters of the pulleys are selected such that at least the pair coupled by the first or second belt are made equal to each other.

Preferably, the first and second belts are selected to be timing belts.

Preferably, the entire pulleys are provided on the same side with respect to the second lever and the fourth lever.

Preferably, a bearing is provided on the extended end of either one of the first driving shaft and the second driving shaft, and the bearing is received in a bearing holder detachably secured to one side of the lever secured to the other one of the driving shaft.

DESCRIPTION OF THE PREFERRED EMBODIMENTS

The invention will now be described in detail with reference to the accompanying drawings.

Figure 1:
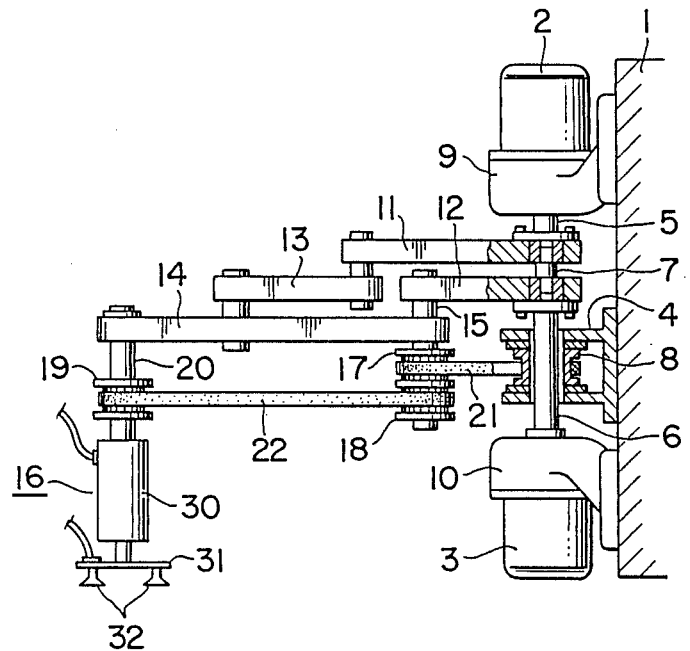
FIG. 1 is an elevational view, partly sectioned, of a preferred embodiment of the present invention.
Figure 2:
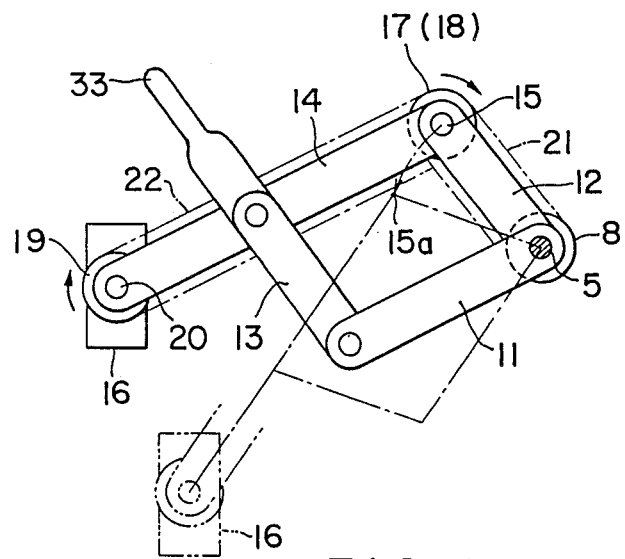
FIG. 2 is a diagram showing the construction of a link-formed arm of the embodiment in a plan view.

In FIGS. 1 and 2 showing a preferred embodiment of the invention, a first driving motor 2 and a second driving motor 3 are secured to a supporting portion 1 of, for instance, a solid wall or end effecter of the robot. A pedestal 4 is also secured to the supporting portion 1. A first driving shaft 5 and a second driving shaft 6 of the driving motors 2 and 3 are extended in alignment, and the drive shafts are connected to the first lever 11 and second lever 12 which are coupled together rotatably by a pin 7. Numeral 8 designates a first pulley fixedly supported on the pedestal 4 in alignment with the driving shafts 5 and 6, and numerals 9 and 10 designate speed reduction mechanisms each provided between the motor and the driving shaft.

One end of a first lever 11 of the robot arm is secured to the first driving shaft 5, while one end of a second lever 12 of the robot arm is secured to the second driving shaft 6. The other end of the first lever 11 is pivotally connected with one end of a third lever 13, while the other end of the second lever 12 is connected via a pivot pin 15 to one end of a fourth lever 14. Intermediate portions of the third lever 13 and the fourth lever 14 are pivotally connected with each other so as to provide parallel links of the robot arm, and a work supporting device 16 is pivotally connected to the other end of the fourth lever 14. A second pulley 17 having a pitch circle diameter equal to that of the first pulley 8 is freely rotatably supported around the pivot pin 15 connecting the second lever 12 and the fourth lever 14. In the shown embodiment, a third pulley 18 having a pitch circle diameter equal to that of the second pulley 17 is formed integrally with the second pulley, and the thus obtained two-step formed pulley is supported by the pivot pin 15 rotatably. However it is apparent that these pulleys 17 and 18 may otherwise be constructed as separate pulleys which are secured to the pivot pin 15 fixedly. A fourth pulley 19 fixedly secured to the work supporting device 16 is rotatably supported by a pivot pin 20 which pivotally connects the device 16 to the other end of the fourth lever 14 as described before. A first belt 21 couples the first pulley 8 and the second pulley 17, while a second belt 22 couples the third pulley 18 and the fourth pulley 19.

In the shown example, the diameters of the entire pulleys are selected to be equal, and the work supporting device 16 is provided with an actuater 30 having a piston rod reciprocable therein. A work holding device 31 having a number of sucking elements 32 is secured to an end of the piston rod for sucking and holding the work. Numeral 33 designates a teach lever formed by an extended portion of the third lever 13. By handling the teach lever 33, the work supporting device 16 can be moved manually, and programmed positions of the device 16 are thereby memorized in a computer.

When one or both of the first and second levers 11 and 12 are moved upon energizing the first and/or second motors 2 and 3, the third lever 13 and the fourth lever 14 forming parallel links of the arm are moved, and the work supporting device 16 is thereby shifted through desired positions in a plane in accordance with a program stored in the computer.

When the first lever 11 and the second lever 12 are both moved by the driving shafts 5 and 6 so as to move the work supporting device 16 as shown by one dot dash line in FIG. 2, the pivot pin 15 revolves around the center of the first pulley 8 and reaches to a position 15a. Since the first pulley 8 is fixed, the first belt 21 rotates the second pulley 17 in an arrow-marked direction. With the rotation of the second pulley 17, the fourth pulley 19 rotates in an arrow-marked direction via the third pulley 18 and the second belt 22. As a consequence, the work supporting device 16 secured to the fourth pulley 19 is rotated around the center of the pivot pin 20 so as to maintain a constant posture regardless of the movement of the work supporting device 16.

In case that the first lever 11 only is swung and the second lever 12 is held in its original position, the first belt 21 is held unmoved. As a consequence, the second pulley 17 and the third pulley 18 are not rotated, while the second belt is shifted by the swinging movement of the fourth lever 14, and the fourth pulley 19 is thereby rotated.

Although, in the shown example, the pitch circle diameters of all of the pulleys are selected to be equal, it is required that the diameters of the pulleys engaging with the same belt are made equal. Athough it is preferable to use timing belts in the shown construction, ordinary V belts may also be used when a precision operation is not required.

Figure 3:
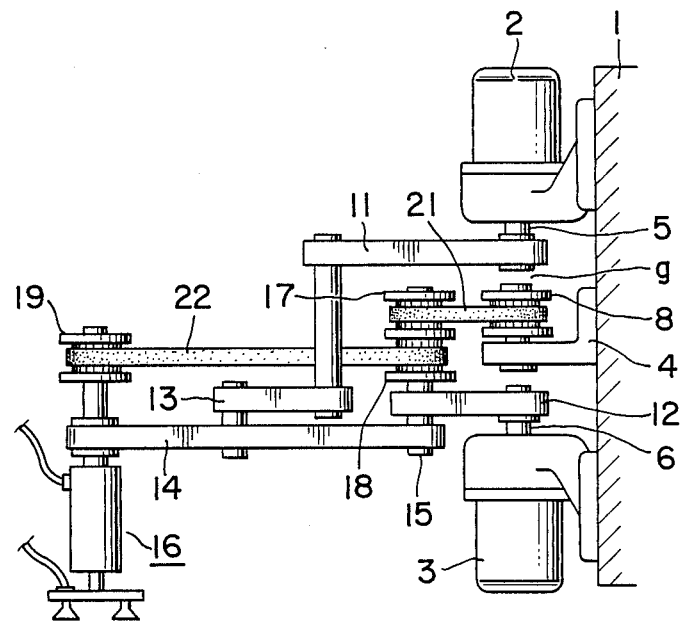
FIG. 3 is an elevational view of another embodiment of the invention.

FIG. 3 illustrates another embodiment of the present invention, wherein similar members as those in FIGS. 1 and 2 are designated by similar reference numerals.

In this embodiment, the first lever 11 secured to the first driving shaft 5 and the second lever 12 secured to the second driving shaft 6 are held in a spaced apart relation, and in this spacing there are provided a pedestal 4 secured to the supporting portion 1 and a first pulley 8 having one end fixedly-supported to the pedestal 4, and having an opposite end freely-accessible in a manner to the case of cantilever. The second, third, and fourth pulleys 17, 18 and 19 are all supported in the cantilever-like manner on the upper side of the second lever 12 and the fourth lever 14. As a consequence, a gap g is formed between the lower end of the first driving shaft 5 and the upper end of the first pulley 8, and the first and second belts 21 and 22 extended around the pulleys can be easily replaced through the gap g, because the pulleys are supported in a cantilever-like manner on the upper side of the second and fourth levers 12 and 14.

Figure 4:
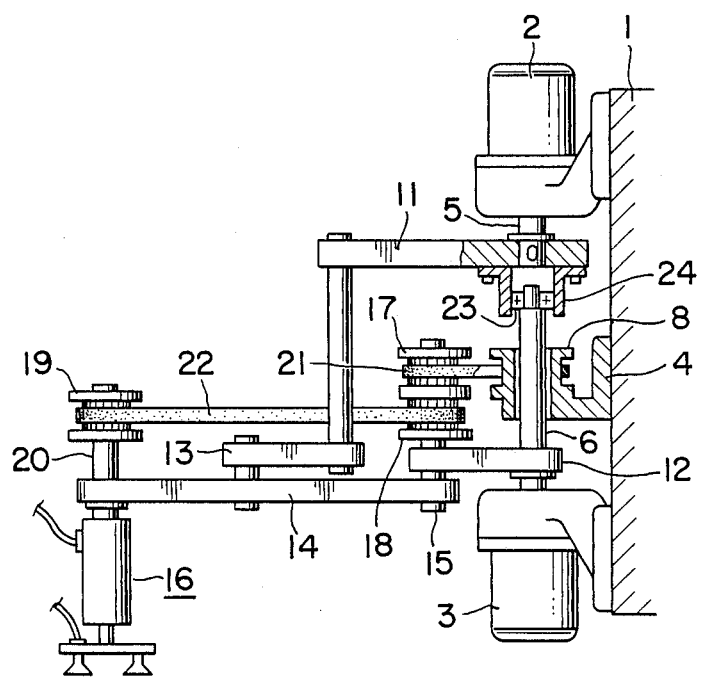
FIG. 4 is an elevational view, partly sectioned, of still another embodiment of the invention.

FIG. 4 illustrates still another embodiment of the invention wherein the first driving shaft 5 and the second driving shaft 6 are disposed in alignment as in the previous embodiment, and one of the driving shafts (driving shaft 6 in the shown example) is extended through the first pulley 8 upward. A bearing 23 is secured to the upper end of the driving shaft 6, while a bearing holder 24 is detachably secured to the lower side of the first lever 11 secured to the first driving shaft 5. The bearing 23 is inserted axially into the bearing holder 24, while the first pulley 8 is supported on one side of the pedestal 4 facing the bearing holder 24. Furthermore, the second, third and fourth pulleys 17, 18 and 19 are supported on the upper side of the second lever 12 and the fourth lever 14 in a cantilever-like manner as in the previous embodiment.

Accordingly, the first driving shaft 5 and the second driving shaft 6 as well as the first pulley 8 are held in alignment. As a result the rigidity of the link system is improved. The precision alignment of the central axes enhances the smooth operation, when it is required to replace the belt, the bearing holder 24 is released from the first lever 11 in a manner sliding over the bearing 23, so that a gap is formed between the bearing holder 24 and the first lever 11, and the first belt 21 is replaced through the thus formed gap. The second belt is replaced as in the second embodiment.

Since the invention is arranged as described above, the work supporting device is always maintained in a constant posture regardless of the movement of the robot arm without the motor driving the work supporting device and without the motor controller maintaining the constant posture of the work supporting device, by adding the pairs of the pulleys and belts to the parallel links and advantageous features such as simplifying the construction, reducing the weight and assuring smooth operation can be thereby realized.

Furthermore, by arranging the first driving shaft and the second driving shaft in a lengthwisely spaced apart relationship, and by placing the first pulley supported in a cantilever-like manner in the space between the two driving shafts, the belts can be replaced easily in a short time.

In a case where a bearing and a detachable bearing holder are provided at the opposing ends of the first and second driving shafts, the driving shafts are coupled with each other in alignment at higher precision and rigidity in coupling while allowing a simple replacement of belts as in the previous arrangement.

What is claimed is:

1. A parallel link robot arm having a work holding device at an end of the arm, comprising:
   first and second driving motors affixed to a supporting member, said driving motors having respective first and second driving shafts axially-aligned with each other;
   a first lever having an end fixedly-supported on said first driving shaft;
   a second lever having an end fixedly-supported on said second driving shaft;
   a third lever having an end pivotally-connected to an opposite end of said first lever;

a fourth lever having an end pivotally-connected to an opposite end of said second lever and having an opposite end rotatably-connected to said work holding device, said fourth lever having an intermediate portion pivotally-connected with an opposite end of said third lever;

a pedestal affixed to said supporting member, said second driving shaft passing through a hollow passage in said pedestal;

a first pulley fixedly-supported on said pedestal and axially aligned with said first and second driving shafts;

a second pulley rotatably-supported around a pivot axis connecting said second lever with said fourth lever, said second pulley having a pitch circle diameter equal to that of said first pulley;

a third pulley rotatably-supported with said second pulley;

a fourth pulley rotatably-supported on an axis connecting said fourth lever with said work holding device, said fourth pulley having a pitch circle diameter equal to that of said third pulley;

a first belt coupling said first pulley with said second pulley; and a second belt coupling said third pulley with said fourth pulley.

2. A parallel link robot arm according to claim 1 further comprising:
a teach lever extending from said opposite end of said third lever.

3. A parallel link robot arm according to claim 1 further comprising:
a pivot pin connecting said first lever and said second lever.

4. A parallel link robot arm according to claim 1 further comprising:
a pivot pin connecting said fourth lever and said work holding device.

5. A parallel link robot arm according to claim 1 wherein said first, second, third, and fourth pulleys have equal pitch circle diameters.

6. A parallel link robot arm according to claim 1 wherein said first, second, third, and fourth pulleys are arranged on one side of said first, second, third, and fourth levers.

* * * * *